US012201215B2

(12) United States Patent
Kopf et al.

(10) Patent No.: US 12,201,215 B2
(45) Date of Patent: Jan. 21, 2025

(54) MECHANISM FOR ELECTRICALLY ADJUSTING WORK SURFACE POSITION

(71) Applicant: FRAMERY OY, Tampere (FI)

(72) Inventors: Markus Kopf, Tampere (FI); Miika Hällfors, Tampere (FI)

(73) Assignee: FRAMERY OY, Tampere (FI)

(*) Notice: Subject to any disclaimer, the term of this patent is extended or adjusted under 35 U.S.C. 154(b) by 121 days.

(21) Appl. No.: 18/247,763

(22) PCT Filed: Oct. 15, 2021

(86) PCT No.: PCT/FI2021/050688
§ 371 (c)(1),
(2) Date: Apr. 4, 2023

(87) PCT Pub. No.: WO2022/084581
PCT Pub. Date: Apr. 28, 2022

(65) Prior Publication Data

US 2023/0371683 A1 Nov. 23, 2023

(30) Foreign Application Priority Data

Oct. 19, 2020 (FI) ..................................... 20206026
Dec. 9, 2020 (FI) ..................................... 20206274

(51) Int. Cl.
*A47B 9/04* (2006.01)
*A47B 5/00* (2006.01)
(Continued)

(52) U.S. Cl.
CPC .................. *A47B 9/04* (2013.01); *A47B 5/00* (2013.01); *A47B 21/06* (2013.01); *E04B 1/8218* (2013.01);
(Continued)

(58) Field of Classification Search
CPC .... A47B 9/00; A47B 9/04; A47B 9/20; A47B 21/06; A47B 2200/0056
See application file for complete search history.

(56) References Cited

U.S. PATENT DOCUMENTS 2,927,665 A 3/1960 Hauf
4,987,835 A * 1/1991 Schwartz ................ A47B 9/00 108/147
(Continued)

FOREIGN PATENT DOCUMENTS

CN 210195370 U 3/2020
EP 2301382 A1 * 3/2011 .............. A47B 9/00
(Continued)

OTHER PUBLICATIONS

European Patent Office, International Search Report and Written Opinion of the Searching Authority, Application No. PCT/FI2021/050688, 14 pages.
(Continued)

*Primary Examiner* — Daniel J Rohrhoff
(74) *Attorney, Agent, or Firm* — Ziegler IP Law Group LLC.

(57) ABSTRACT

An adjustment mechanism assembly for adjusting a work surface position vertically includes a vertical guiding element, a work surface support element engaged with the vertical guiding element and configured to be movable vertically with electric actuation, and means for the electric actuation comprising a cable. The adjustment mechanism assembly includes a vertical support member which extends vertically from within the vertical guiding element to outside it or resides completely within the vertical guiding element. The cable includes a spiraled portion between its termini, which spiraled portion is supported with respect to its central axis by the support member. The disclosed solution also has
(Continued)

a wall structure and a table comprising such an adjustment mechanism assembly.

19 Claims, 13 Drawing Sheets

(51) Int. Cl.

| | |
|---|---|
| ***A47B 21/06*** | (2006.01) |
| ***E04B 1/82*** | (2006.01) |
| ***E04H 1/12*** | (2006.01) |
| ***E06B 3/06*** | (2006.01) |

(52) U.S. Cl.

CPC ............... *E04H 1/125* (2013.01); *E06B 3/06* (2013.01); *A47B 2200/0056* (2013.01)

(56) References Cited

U.S. PATENT DOCUMENTS

| | | | | |
|---|---|---|---|---|
| 6,024,025 | A | 2/2000 | Koch et al. | |
| 6,352,037 | B1 * | 3/2002 | Doyle | A47B 9/00 108/50.02 |
| 6,595,144 | B1 * | 7/2003 | Doyle | A47B 9/00 248/188.4 |
| 9,593,481 | B2 * | 3/2017 | Gosling | A47B 57/06 |
| 9,655,438 | B1 * | 5/2017 | Shoenfeld | A47B 21/02 |
| 9,675,170 | B2 | 6/2017 | Klinke | |
| 9,723,920 | B1 * | 8/2017 | Wu | H02K 7/06 |
| 10,334,948 | B2 * | 7/2019 | Xiang | A47B 96/14 |
| 11,261,600 | B2 * | 3/2022 | Gosling | F16M 11/18 |
| 2016/0360879 | A1 * | 12/2016 | Kelley | A47B 21/06 |
| 2017/0258218 | A1 * | 9/2017 | Klinke | A47B 9/00 |
| 2018/0090915 | A1 | 3/2018 | Byrne et al. | |
| 2022/0232967 | A1 * | 7/2022 | Lin | H02G 11/00 |
| 2024/0306809 | A1 * | 9/2024 | Cameron | H01B 7/065 |

FOREIGN PATENT DOCUMENTS

| | | | |
|---|---|---|---|
| KR | 100799284 | B1 | 1/2008 |
| KR | 20170096410 | A | 8/2017 |
| NL | 2004139 | C2 | 7/2011 |
| RU | 198733 | U1 | 7/2020 |
| WO | 2011063812 | A2 | 6/2011 |
| WO | 2017134341 | A1 | 8/2017 |
| WO | 2018213062 | A1 | 11/2018 |

OTHER PUBLICATIONS

European Patent Office, International Search Report and Written Opinion, Application No. PCT/FI2021/050690, mailed Jan. 26, 2022, 12 pages.

Finnish Patent and Registration Office, Office Action, Application No. 20206026, Mailed Sep. 27, 2022, 4 pages.

Finnish Patent and Registration Office, Office Action, Application No. 20206274, mailed Oct. 6, 2022, 5 pages.

Finnish Patent and Registration Office, Search Report, Application No. 20206026, mailed Apr. 30, 2021, 1 page.

Finnish Patent and Registration Office, Search Report, Application No. 20206274, mailed Jun. 28, 2021, 2 pages.

Liz, "A Closer Look at Sound Damping vs. Absorption" Technicon Acoustics Sound Science, Posted Sep. 30, 2019, https://www.techniconacoustics.com/blog/sound-damping-vs-absorption/, 5 pages.

* cited by examiner

E - E

B - B

F - F

MECHANISM FOR ELECTRICALLY ADJUSTING WORK SURFACE POSITION

FIELD

The present disclosure generally relates to mechanisms for adjusting work surface position, such as mechanisms for electrically height adjustable sit stand desks. The solution also relates to wall structures and tables comprising such mechanism.

BACKGROUND

This section illustrates useful background information without admission of any technique described herein representative of the state of the art.

Height adjustable, including electrically height adjustable, desks, such as electrically height adjustable sit stand desks, are known in the industry. Typically, height adjustment is effectuated by a height adjustment mechanism.

An electrical height adjustment mechanism employs a cable or cables to convey electricity and/or electrical signals, for example, between a control unit and a user interface of the electrical height adjustment mechanism.

Currently, at least some cables of electrical height adjustment mechanisms, particularly the cable or cables running between the control unit and the user interface, are mostly or fully exposed creating a nuisance for the user, for example by interfering with free movement of the user's legs. Moreover, such an exposed cable or cables create a risk of cable damage for example in case of forceful contact between the cable and the user or another external object.

Therefore, there is a need to address these deficiencies.

SUMMARY

The appended claims define the scope of protection.

According to a first example aspect there is provided an adjustment mechanism assembly for adjusting a work surface position vertically, comprising a vertical guiding element, a work surface support element engaged with the vertical guiding element and configured to be movable vertically with electric actuation, means for said electric actuation comprising a cable, and a vertical support member which resides at least partially within the vertical guiding element, which cable comprises a spiraled portion between its termini, which spiraled portion is supported with respect to its central axis by the vertical support member.

In certain embodiments, the vertical support member extends vertically from within the vertical guiding element to outside the vertical guiding element. In certain other embodiments, the vertical support member resides completely within the vertical guiding element. The vertical support member is preferably arranged parallelly with the vertical guiding element, more preferably the vertical support member is arranged coaxially with the vertical guiding element.

In certain embodiments, the work surface support element is arranged to protrude horizontally from within the vertical guiding element between the (top and bottom) ends of the vertical guiding element. In certain embodiments, the work surface support element is configured to move along the vertical guiding element in the longitudinal direction of the vertical guiding element.

In certain embodiments, the work surface support element is engaged with the vertical guiding element through a vertically oriented slit in a side of the vertical guiding element. The work surface support element is preferably configured to be movable vertically within said vertically oriented slit with electric actuation.

In certain embodiments, the height (in the vertical or longitudinal direction) of the vertical guiding element or/and the vertical support member is/are constant. In certain embodiments, the height (in the vertical or longitudinal direction) of the adjustment mechanism assembly is constant.

In certain embodiments, the vertical guiding element is a one-piece element. In certain embodiments, the vertical guiding element consists essentially of one vertical guiding member (in contrast of having for example a telescopic structure). Said vertical guiding member is preferably a one-piece member, such as a one-piece column. In certain embodiments, the vertical guiding element is formed of a shell of a column (or of an outer shell of a column assembly).

In certain embodiments, the spiraled portion is configured to extend and contract with vertical movement of the work surface support element. Advantageously, said extending and contracting is in the longitudinal direction of the spiraled portion.

In certain embodiments, the work surface support element is adapted to provide support for a work surface, such as a table top.

In certain embodiments, the means for electric actuation comprises an electrical user interface and a control unit connected with the cable to the electrical user interface. In certain embodiments, the means for electric actuation comprises an electrical user interface, a control unit connected with the cable to the electrical user interface, and at least one actuator, such as motor, effecting the movement of the work surface support element and connected to the control unit.

In certain embodiments, the adjustment mechanism assembly comprises an electrical user interface and a control unit or an equivalent connection point connected with the cable to the electrical user interface. In certain embodiments, the cable, en route from the electrical user interface to the control unit or an equivalent connection point, and before the spiraled portion, enters into inside the vertical guiding element at the work surface support element.

In certain embodiments, at least a portion of the spiraled portion of the cable resides outside the vertical guiding element. In certain other embodiments, the the spiraled portion of the cable resides completely within the vertical guiding element. In certain embodiments, at least a portion of the spiraled portion of the cable resides within the vertical guiding element.

In certain embodiments, the vertical guiding element comprises an aperture through which the vertical support mechanism or member extends vertically from within the vertical guiding element to the outside the vertical guiding element. In certain embodiments, at least a portion of the spiraled portion of the cable extends through the aperture and resides outside the vertical guiding element.

In certain embodiments, the cable is arranged to enter into inside of the vertical guiding element at the work surface support element.

In certain embodiments, that end portion of the vertical support member which resides outside the vertical guiding element is connected to a support element configured to prevent movement of said end portion of the vertical support member. In certain embodiments, that end of the vertical support member which resides outside the vertical guiding element is connected to a support element adapted to hold said end of the vertical support member in place.

In certain embodiments, the vertical support member or/and the vertical guiding element is/are configured to be unmoving. In certain embodiments, the vertical guiding member in itself is stationary or immobile or constant in height. In certain embodiments, the vertical support member in itself is stationary or immobile or constant in height.

In certain embodiments, the adjustment mechanism assembly comprises at least two strain relievers connected to the cable such that the spiraled portion of the cable resides between two strain relievers.

In certain embodiments, the support element comprises one of said two strain relievers, the work surface support element comprises another of said two strain relievers, and the spiraled portion of the cable resides between these two strain relievers.

In certain embodiments, the vertical support member is a rod and the spiraled portion of the cable is spiraled around the rod.

In certain embodiments, the vertical support member is a pipe preferably comprising a vertically extending slit, and the spiraled portion of the cable is housed within the pipe.

In certain embodiments, the vertical support member is an enclosure preferably comprising a vertically extending slit, and the spiraled portion of the cable is housed within the enclosure.

In certain embodiments, the vertical support member is a plate or a wall, and the spiraled portion of the cable resides next to the plate or the wall.

In certain embodiments, the adjustment mechanism assembly comprises a further or additional vertical guiding element, and a further or additional work surface support element engaged with the further or additional vertical guiding element and configured to be movable vertically. In certain embodiments, the adjustment mechanism assembly comprises more than one vertical guiding element and a respective worksurface support element is engaged to each vertical guiding element.

In certain embodiments, the adjustment mechanism assembly comprises at least one mounting support element connected to the vertical guiding element(s) and adapted for mounting the adjustment mechanism assembly for example to a mounting surface, such as a wall.

According to a second example aspect, there is provided a wall structure comprising an adjustment mechanism assembly according to the first example aspect.

In certain embodiments, the adjustment mechanism assembly is mounted to an outer surface of the wall structure.

In certain embodiments, the adjustment mechanism assembly is mounted to a mounting surface within the wall structure such that the work surface support element(s) extend to outside of the wall structure through vertical slit(s) in the wall structure configured to allow the work surface support element(s) to move vertically.

According to a third example aspect, there is provided a height-adjustable table comprising an adjustment mechanism assembly according the first example aspect, and a work surface supported by the work surface support element(s).

In certain embodiments, the height adjustable table comprises at least one guiding element support member, such as a leg, adapted to support the vertical guiding element(s) in an upright position.

Different non-binding example aspects and embodiments have been illustrated in the foregoing. The embodiments in the foregoing are used merely to explain selected aspects or steps that may be utilized in different implementations. Some embodiments may be presented only with reference to certain example aspects. It should be appreciated that corresponding embodiments may apply to other example aspects as well.

BRIEF DESCRIPTION OF THE FIGURES

Some example embodiments will be described with reference to the accompanying figures, in which.

Figure 1:
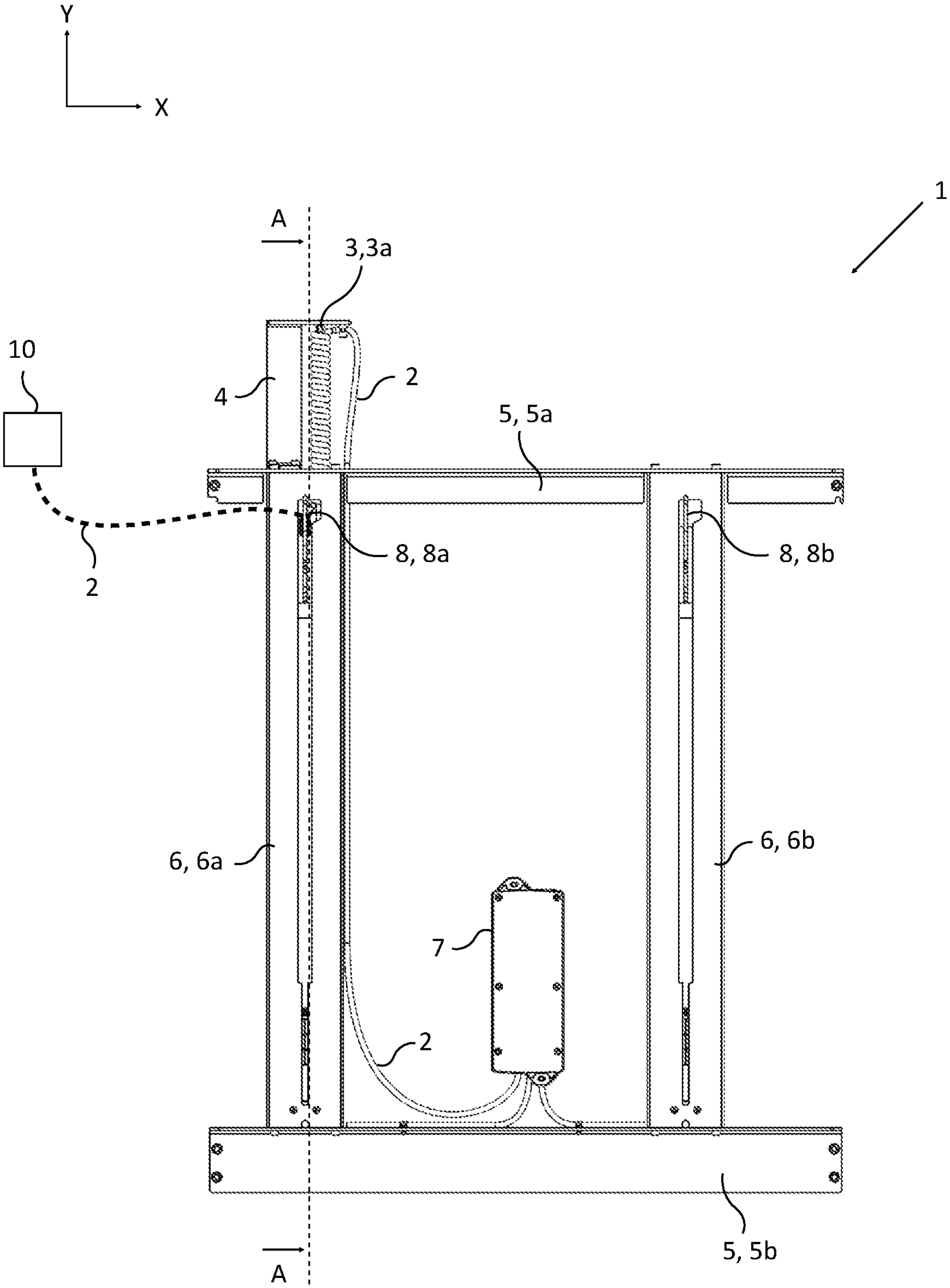
FIG. 1 schematically illustrates, according to an example embodiment, an adjustment mechanism assembly according to the disclosed solution as viewed from the front.

The figures are intended for illustrating the idea of the disclosed solution. Therefore, the figures are not in scale or suggestive of a definite layout of system components.

DETAILED DESCRIPTION OF THE INVENTION

In the following description, like reference signs denote like elements or steps. Reference is made to the figures with the following numerals and denotations:

- 1 Adjustment mechanism assembly
- 2 Cable, for electrical user interface connectivity
- 2' Spiraled portion, of cable
- 3 Vertical support member, for spiraled portion, of cable
- 3*a* Rod, -type of vertical support member, for spiraled portion, of cable
- 3*b* Pipe, -type of vertical support member, for spiraled portion, of cable
- 3*c* Enclosure, -type of vertical support member, for spiraled portion, of cable
- 3*d* Wall or plate, -type of vertical support member, for spiraled portion, of cable
- 4 Support element, for vertical support member
- 5, 5*a*, 5*b* Mounting support element
- 6, 6*a*, 6*b* Vertical guiding element
- 7 Control unit
- 8, 8*a*, 8*b* Work surface support element
- 9 Work surface
- 10 Electrical user interface
- 11 Electrical socket
- 12 Data connection socket
- 13 Network connection socket
- 14 Height adjustment control
- 15 Control
- 16 Wireless charging element
- 20 Mounting surface
- 21 Wall structure
- 22 Concealment cover
- 23 Leg, for the adjustment mechanism assembly
- 30 Threaded rod
- 31 Motor
- 40 Aperture
- 41 Strain reliever, for cable
- 42 Slit, for cable, in vertical support member
- C Central axis, of spiraled portion, of cable
- L Effective length, for spiraled portion, of cable
- X, Y, Z Orthogonal coordinates in the frame of adjustment mechanism assembly Electrically adjustable height adjustment mechanisms for work surfaces may comprise one or more guiding elements, for example columns, typically vertically oriented, which guiding elements may house means for adjusting the vertical position or height of elements for supporting a work surface. In implementations comprising more than one guiding element, the guiding elements are preferably distinct or separate guiding elements positioned a horizontal distance or distances away from each other. Electrical adjusting mechanisms may comprise a user-accessible electrical user interface, such as raising and lowering command buttons to change the height of elements supporting the work surface and thus effectively change the height of the work surface. The electrical user interface may be positioned at or in the immediate vicinity of the work surface.

The electrical user interface typically requires an electrical cable to convey electricity and/or electrical signals to, for example, a control unit of the adjustment mechanism to execute user commands provided with the electrical user interface and/or to convey electricity to the electrical user interface for the user's disposal. Often, the command unit resides elsewhere in the adjustment mechanism, i.e. distant from the electrical user interface. However, a cable may be arranged from the electrical user interface to the command unit or an equivalent connecting point.

Figure 4:
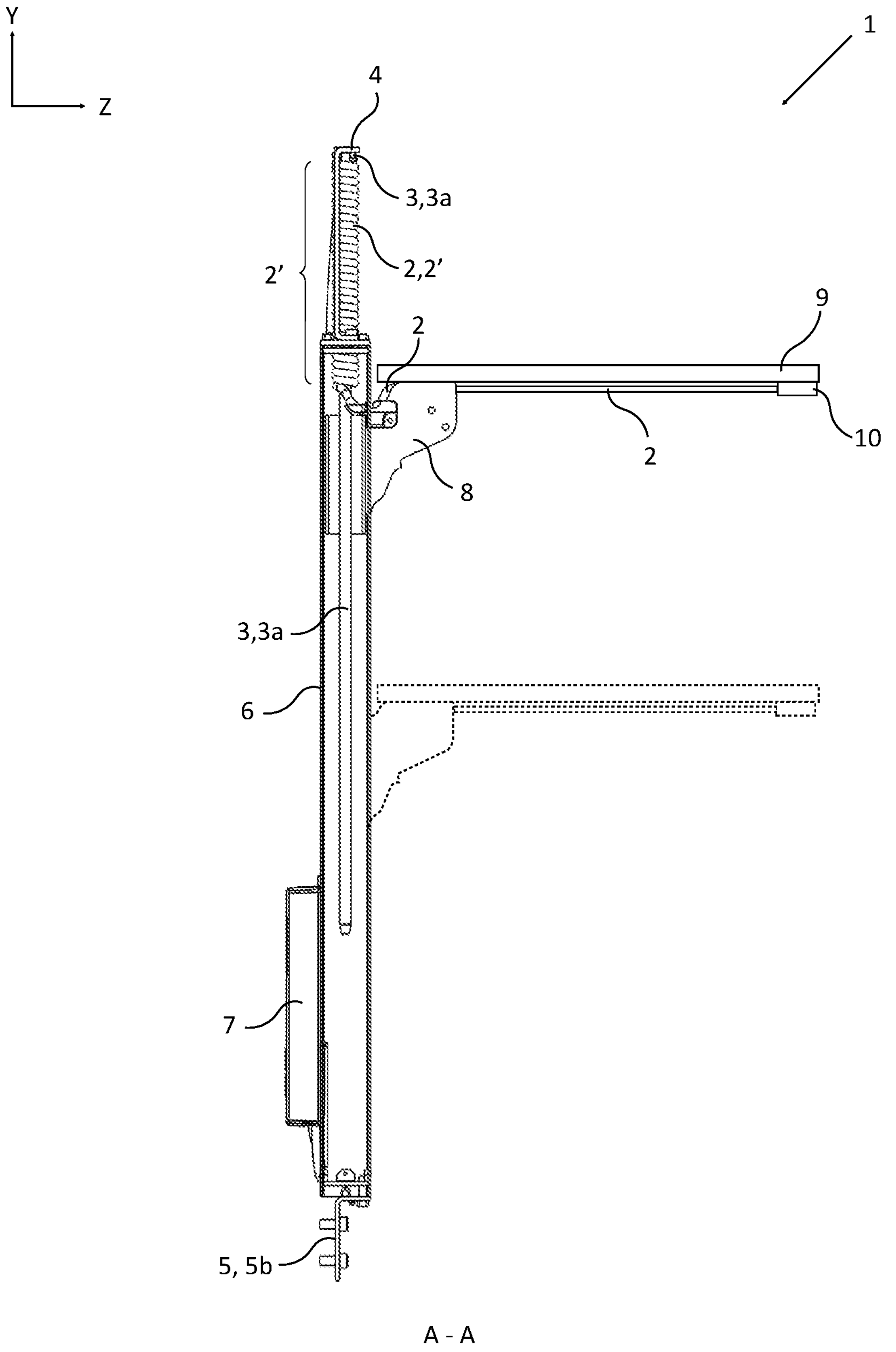
FIG. 4 schematically illustrates the adjustment mechanism assembly of FIG. 1 plus a work surface with a cable connected electrical user interface, as viewed from a side and in a cross-section denoted in FIG. 1. Work surface movement is illustrated by way of depicting another exemplary position for the work surface with dashed lines.

The present disclosure provides an adjustment mechanism assembly 1 for electrically adjusting a vertical position of a work surface 9 connectable to the adjustment mechanism assembly 1, for example as shown in the embodiment of FIG. 4. Thus, the disclosed solution comprises an adjustment mechanism assembly 1 for e.g. electrically adjusting the height of a table.

The adjustment mechanism assembly 1 comprises at least one vertical guiding element 6 advantageously providing attachment and/or movement guidance for a work surface support element 8 or several work surface support elements 8 to which a work surface 9 may be attached, for example as shown in the embodiment of FIG. 1. The vertical guiding element 6 may be provided with, or comprise, a slit through which at least a part of the work surface support element 8 may extend into the vertical guiding element 6 for connection or engagement therein. Said slit may be a slit arranged longitudinally in a side of the vertical guiding element 6, between the ends of the vertical guiding element 6. The work surface support element 8 is preferably configured to be movable vertically within said slit with electric actuation.

The work surface support element 8 may be partially housed within the vertical guiding element 6. The work surface support element 8 may be arranged to protrude horizontally from within the vertical guiding element 6 to the outside of the vertical guiding element 6. The work surface support element 8 may be arranged to protrude from a side of the vertical guiding element 6, for example through the longitudinally arranged slit described above, between the ends of the vertical guiding element 6.

Figure 3:
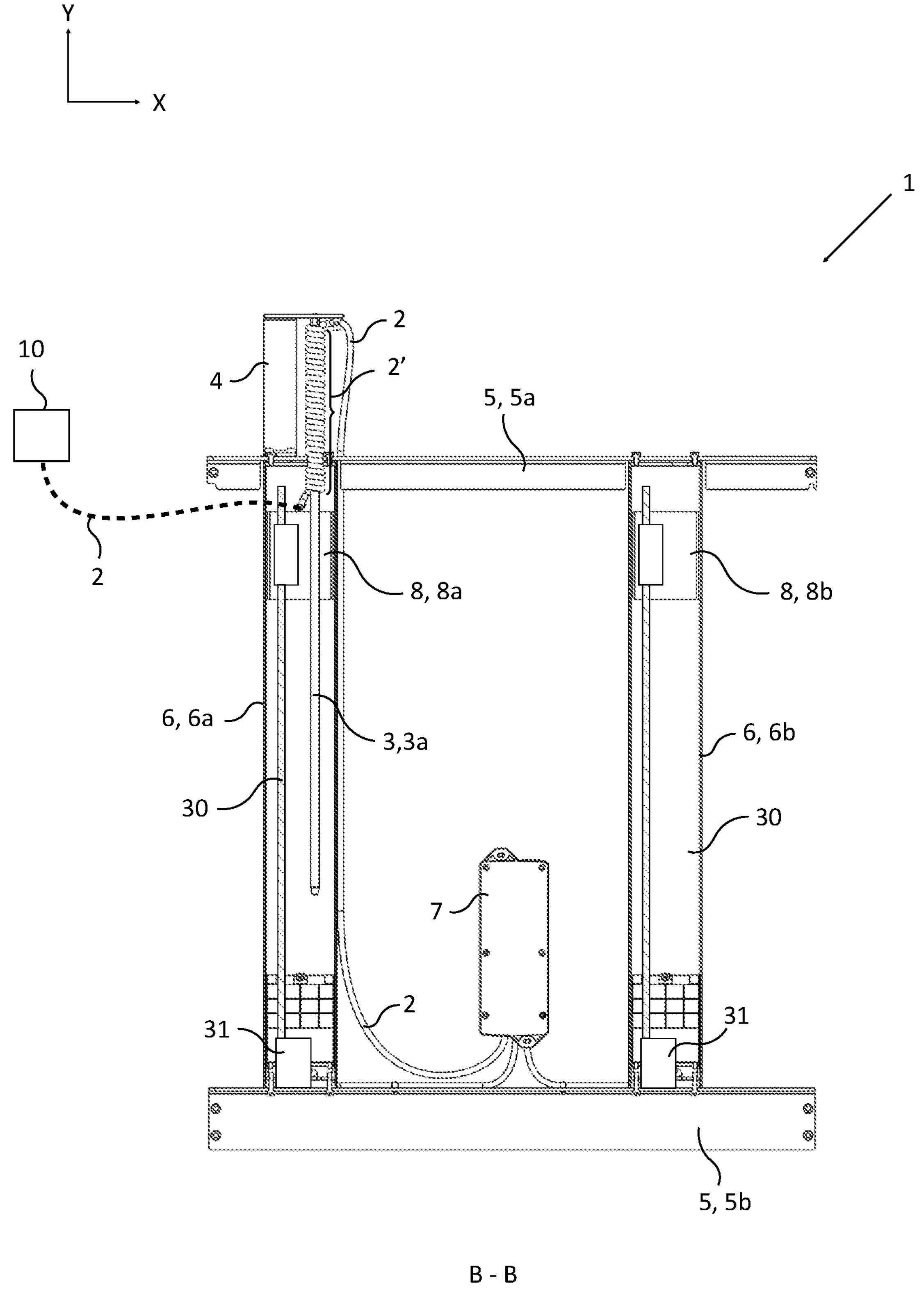
FIG. 3 schematically illustrates the adjustment mechanism assembly of FIG. 1 as viewed from the front and in a cross-section denoted in FIG. 2.

The vertical guiding element 6 may, for example within it, comprise a mechanism for providing movement for the work surface support element 8. For example as shown in the embodiment of FIG. 3, the vertical guiding element 6 may, for example within it, comprise a threaded rod 30 which extends through the work surface support element 8, for example through the portion of the work surface support element 8 that is housed within the vertical guiding element 6. In such embodiments, the portion of the work surface support element 8 through which the treated rod 30 extends may comprise threads configured to interconnect with the threaded rod 30 so that when the threaded rod 30 rotates, the work surface support element 8 moves accordingly.

In certain embodiments, the adjustment mechanism assembly 1 comprises one vertical guiding element 6. Such a setup is advantageous in e.g. applications in which small size for the adjustment mechanism assembly 1 is desired.

In certain other embodiments, for example as shown in the embodiment of FIGS. 1 and 3, the adjustment mechanism assembly 1 comprises two vertical guiding elements 6*a*, 6*b*. The vertical guiding elements 6*a*, 6*b* may be two distinct guiding elements positioned a (horizontal) distance away from each other. Such a setup is advantageous in e.g. applications in which it is advantageous to have the work surface 9 supported at or near both its ends to prevent the work surface 9 from wobbling or tilting.

In certain yet other embodiments, the adjustment mechanism assembly 1 comprises three or more vertical guiding elements 6. The vertical guiding elements 6 may be distinct guiding elements positioned a (horizontal) distance away from each other. Such a setup is advantageous in e.g. applications in which it is advantageous to provide great amount of lifting or supporting force for a heavy work surface 9 or a work surface 9 with heavy objects on it.

Figure 7A:
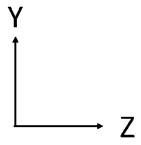
FIGS. 7*a*-*d* schematically illustrate example embodiments of mounting setups for an adjustment mechanism assembly according to the disclosed solution, as viewed from a side and with the adjustment mechanism depicted in the same cross-section as in FIG. 3.
Figure 7A:
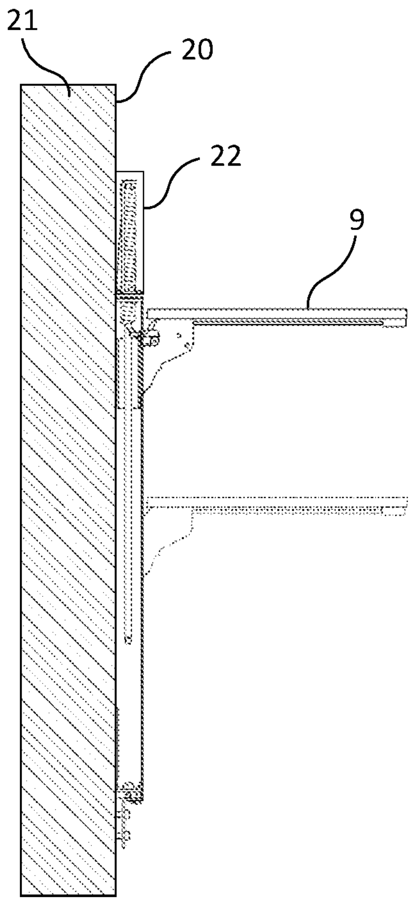
Figure 7B:
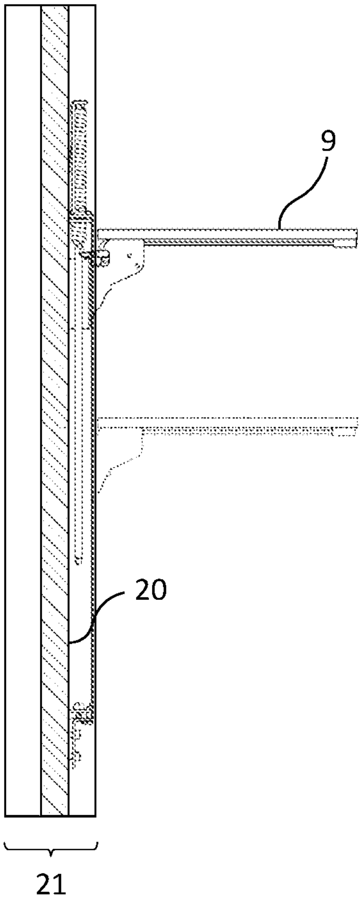
Figure 7C:
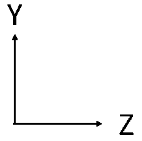
Figure 7C:
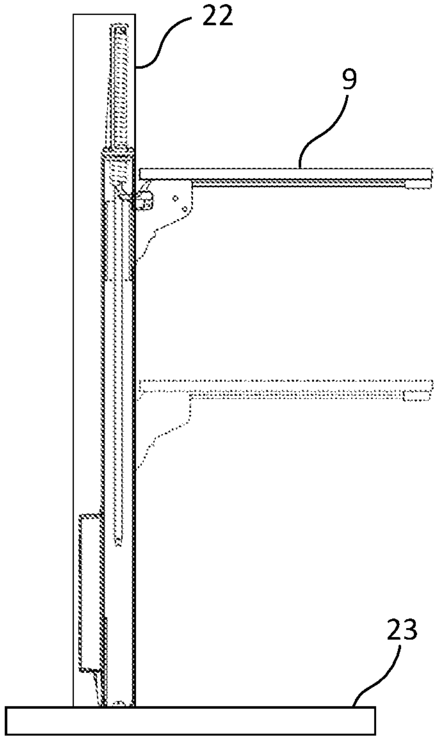
Figure 7D:
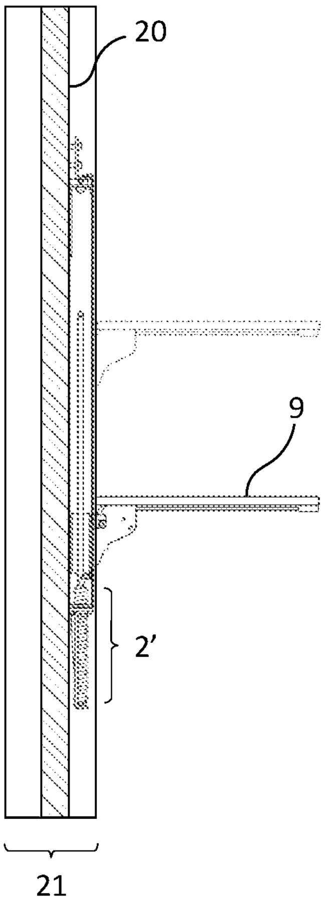

For example as shown in the embodiment of FIG. 7*c*, the adjustment mechanism assembly 1 may be configured to stand on a floor e.g. in applications in which a floor-standing or independently standing table setup is desired. In such embodiments, the adjustment mechanism assembly 1 may be coupled with or comprise a guiding element support member, such as a horizontally oriented support plate or a leg 23 or several such plates or legs 23, to support the adjustment mechanism assembly 1 in an upright position. Particularly, said guiding element support member or members may be adapted to support a vertical guiding element 6 or vertical guiding elements 6 of the adjustment mechanism assembly 1 in an upright position.

In certain embodiments, the adjustment mechanism assembly 1 may be enveloped at least partially with a concealment cover 22 to prevent inappropriate or accidental user interaction with parts, especially moving parts, of the adjustment mechanism assembly 1. Particularly, a concealment cover 22 may be employed in a floor-standing or independently standing setup, or in a setup where the adjustment mechanism assembly 1 is mounted on the outer surface of a wall (wall surface-mounted setup), for example as shown in the embodiments of FIG. 7*c* and FIG. 7*a*, respectively.

In certain embodiments, the adjustment mechanism assembly 1 is mounted to a mounting surface 20. The mounting surface may be for example a wall, for example a surface of a wall, as shown for example in the embodiment of FIG. 7*a*.

In certain embodiments, the adjustment mechanism assembly 1 may be embedded within a wall or wall structure 21 such that a portion of the work surface support element(s) 8 extend(s) from within the wall structure 21 for connection with a work surface 9, for example as shown in the embodiment of FIG. 7*b*. Such an arrangement is advantageous as the vertical guiding element(s) 6 in particular do not consume any space from the working area in which the work surface 9 is installed. Such an arrangement is also advantageous as the vertical guiding element(s) 6 in particular do not interfere with humans, objects or acoustics within the working area in which the work surface 9 is installed. Such an arrangement is also advantageous as the vertical guiding element(s) 6 in particular do not interfere cleaning the surface of the wall structure 21 within which the adjustment mechanism assembly 1 is embedded.

The wall to which the adjustment mechanism assembly may be mounted, for example by attaching it to a wall surface or by embedding it within the wall structure 21, may be, for example, a wall of a building or a wall of an enclosed sound-attenuating portable structure such as an office booth or an office pod.

For mounting the adjustment mechanism assembly 1 comprising the vertical guiding element(s) 6, the vertical guiding element(s) 6 may be equipped with e.g. fixture apertures or integral mounting fixings. Alternatively, or in addition, the adjustment mechanism assembly 1 may comprise one or more mounting support elements 5 via which the adjustment mechanism assembly 1 can be attached to a wall structure 21, either onto a surface or within it. Examples of mounting support elements 5 are shown for example in the embodiment of FIG. 1. The mounting support element(s) may be connected to the vertical guiding element(s) 6 such that the mounting support element(s) 5 may provide positional rigidity to the vertical guiding element(s) 6. Such mounting support element(s) 5 may be horizontally aligned.

In certain embodiments, for example as illustrated in the embodiment of FIG. 1, the adjustment mechanism assembly 1 comprises two horizontal or essentially horizontal mounting support elements 5*a*, 5*b* each of which is connected to a vertical guiding element 6. For example, as shown in the embodiment of FIG. 1 comprising two vertical guiding elements 6*a*, 6*b*, the adjustment mechanism assembly 1 may comprise two horizontal or essentially horizontal mounting support elements 5*a*, 5*b* each of which is connected to each of two vertical guiding elements 6*a*, 6*b*. Particularly, as shown in the embodiment of FIG. 1 comprising two vertical guiding elements 6*a*, 6*b*, the adjustment mechanism assembly 1 may comprise one upper horizontal mounting support element 5*a* which is connected to the upper end of each of the two vertical guiding elements 6*a*, 6*b*, and one lower horizontal mounting support element 5*b* which is connected to the lower end of each of the two vertical guiding elements 6*a*, 6*b*. Such an arrangement is advantageous in that it offers high dimensional and structural rigidity as the horizontal support elements 5*a*, 5*b* and the vertical guiding elements 6*a*, 6*b* form a horizontally and vertically extending structure with spatially spaced out connecting points, and as the mounting points of the adjustment mechanism 1 can be spatially spaced out on the plane of the wall structure 21.

In certain embodiments, for example as shown in the embodiment of FIG. 3, the vertical guiding element(s) 6 house an actuator such as a motor 31 to effect the movement of the work surface support element(s) 8. For example, such an actuator may effect the rotational movement of a threaded rod 30 and, consistent with what has been described above, thus effecting the movement of the work surface support element(s) 8. To provide actuation signals and/or power to the actuator(s) such as motor(s) 31, the adjustment mechanical assembly 1 may comprise a control unit 7, for example as shown in the embodiment of FIG. 1.

Figure 2:
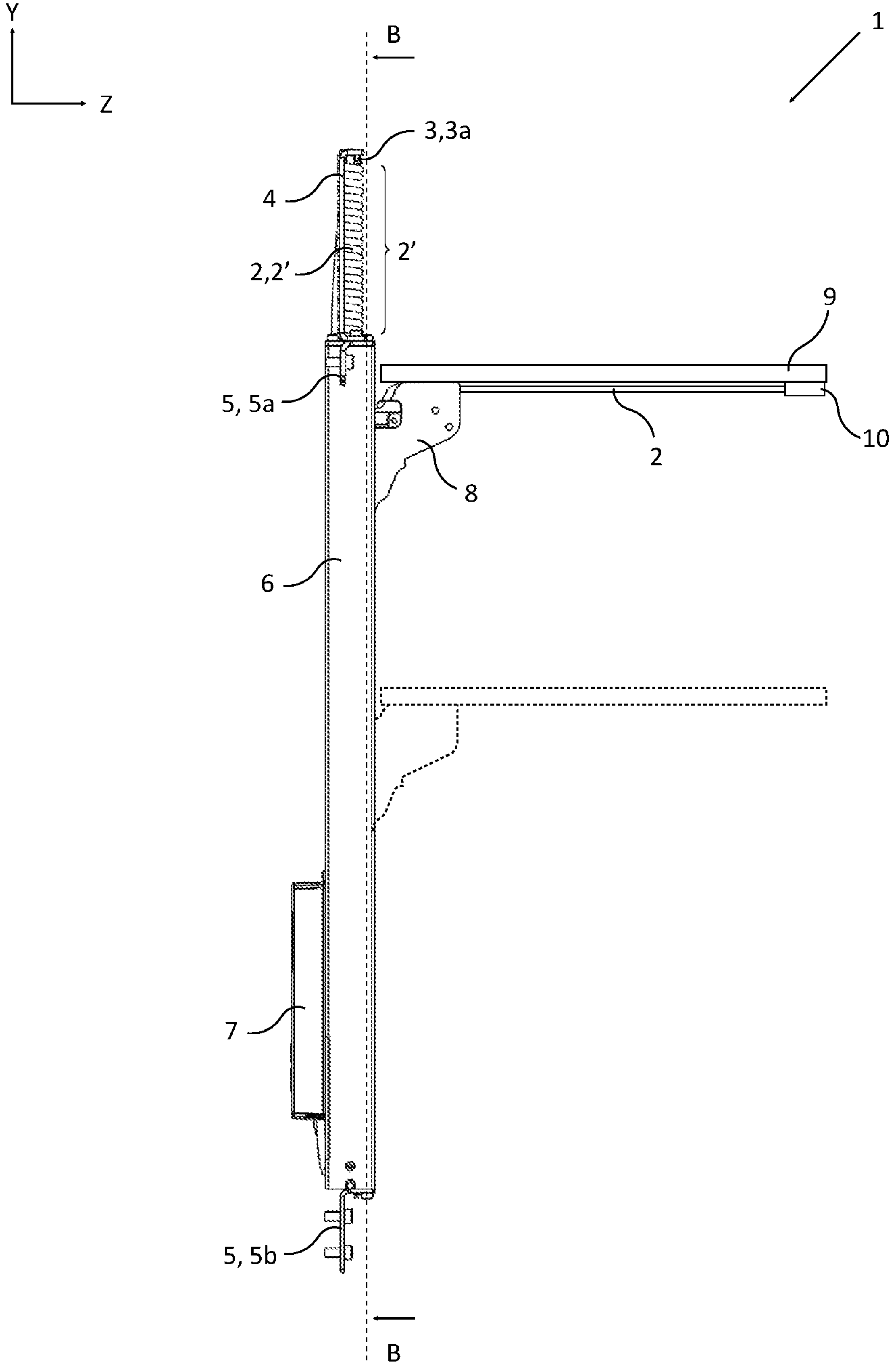
FIG. 2 schematically illustrates the adjustment mechanism assembly of FIG. 1 and a work surface with a cable connected electrical user interface connected thereto, as viewed from a side. Work surface movement is illustrated by way of depicting another exemplary position for the work surface with dashed lines.

To provide user convenience and especially in embodiments in which the control unit 7 is, for example together with the vertical guiding element(s) 6, embedded within a wall structure 21, a user of the adjustment mechanism assembly 1 is provided an electrical user interface 10, preferably within his or her immediate reach. Such an electrical user interface 10 may be provided, for example, within, on or under the work surface 9 such as a table top. The embodiment of FIG. 2, for example, shows an example installation of an electrical user interface 10 under the work surface 9. It is to be understood that in FIGS. 1 and 3 the electrical user interface is not illustrated with any respect to its physical positioning.

Figure 6:
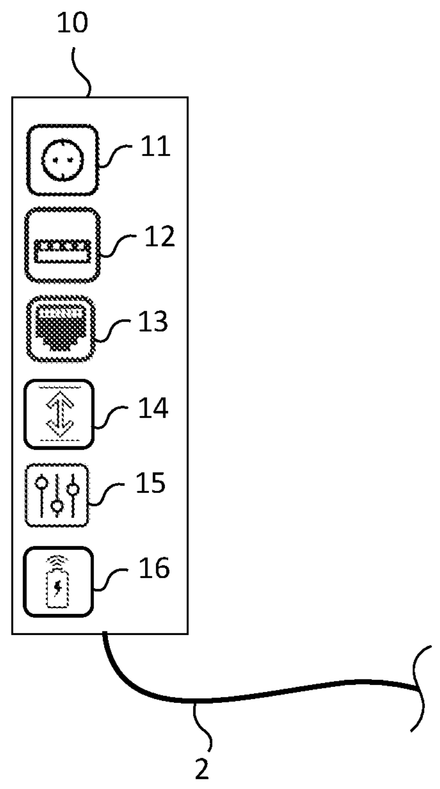
FIG. 6 schematically illustrates possible functionalities of an electrical user interface.

FIG. 6 shows an example of an electrical user interface 10. The electrical user interface 10 may comprise a height adjustment control 14, for example in the form of an "upwards" button and a "downwards" button or an equivalent control interface to provide corresponding movement command signals to effect the movement of the work surface support element(s) 8 and thus the movement of the work surface 9. Such movement command signals typically travel through from the electrical user interface 10 to the control unit 7 which, in turn, provides actuation signals and/or power to the actuators effecting the movement of the work surface support element(s) 8, as schematically illustrated in the embodiment of FIG. 1 for example.

As illustrated for example in FIG. 6, the electrical user interface 10 may comprise in addition to the height adjustment control 14, for example, an electrical socket 11 to provide electricity to (the user's) appliances such as a laptop computer charger; and/or

- a data connection socket 12 such as an USB interface socket to provide data connectivity to the control unit 7 and/or to devices external to the adjustment mechanism assembly 1; and/or
- a network connection socket 13 such as an Ethernet network port to provide (the user with) a network connectivity; and/or
- a wireless charging element 16 to provide the user with wireless charging of e.g. a mobile phone on the work surface 9 without a need of a charging cable; and/or
- another control 15 to control other functionalities of the adjustment mechanism assembly 1 such as the speed with which the work surface 9 moves when moved and/or to control functionalities external to the adjustment mechanism assembly 1 such as the lighting and/or the ventilation of a working area, such as a sound-insulation booth, in which the work surface 9 resides.

The electrical user interface 10 may be connected to the control unit 7 with an electrical cable 2, as schematically illustrated in FIG. 1 for example.

It is advantageous to convey or arrange the cable 2 at least partially within the elements of the adjustment mechanism assembly 1. This may for example prevent damage to the cable 2 due to user interference of contact with other human beings or foreign objects and to provide user with convenience without disturbing and interfering cable(s) 2.

In certain embodiments, a portion of (the length of) the cable 2 is conveyed or arranged within the vertical guiding element 6. A portion (of the length) of the cable 2 may optionally be conveyed within other elements of the adjustment mechanism assembly 1 as well, such as within or concealed by a mounting support element 5.

In certain embodiments, the cable 2 enters into the inside of the vertical guiding element 6 at the work surface support element 8, for example as shown in the embodiment of FIG. 4. Particularly, the route of the cable 2 from the electrical user interface 10 to the control unit 7 or an equivalent connection point may be arranged such that on its way from the electrical user interface 10 towards the control unit 7, the cable 2 enters into the inside of the vertical guiding element 6 at the work surface support element 8.

Figure 8A:
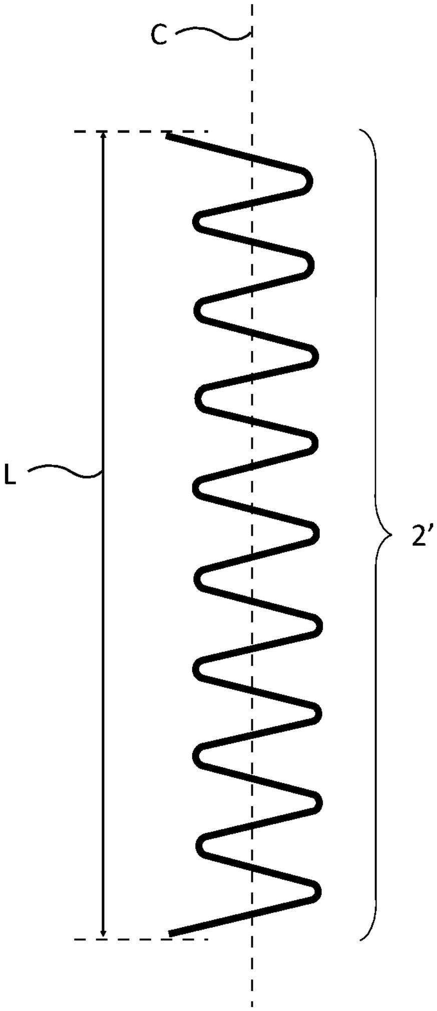
FIG. 8*a* schematically illustrates the effective length and the central axis of a spiraled portion of a cable in an extended state of the spiraled portion.
Figure 8B:
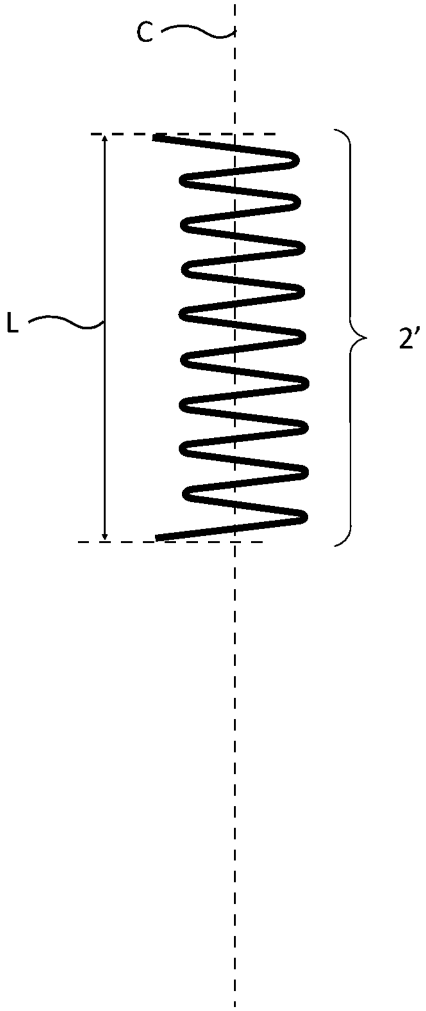
FIG. 8*b* schematically illustrates the effective length and the central axis of a spiraled portion of a cable in a contracted state of the spiraled portion and with the absolute length of the portion of the cable forming the spiraled portion being the same as in FIG. 8*a*.
Figure 9A:
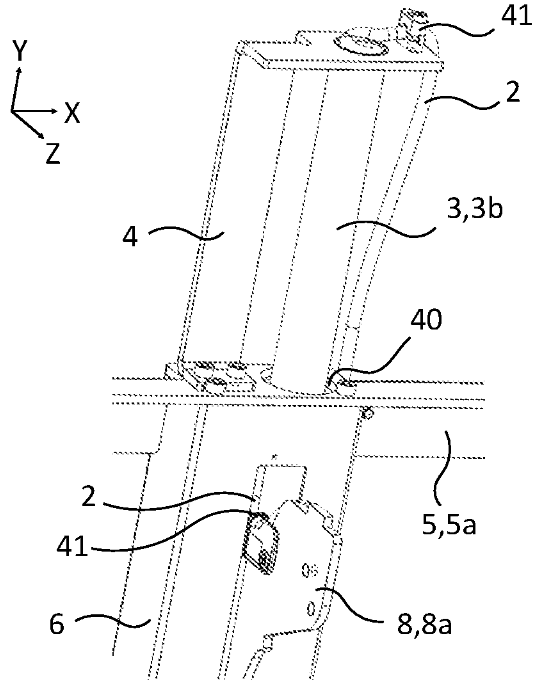
FIGS. 9*a*-9*d* schematically illustrate, according to another example embodiment, an adjustment mechanism assembly according to the disclosed solution.
Figure 9B:
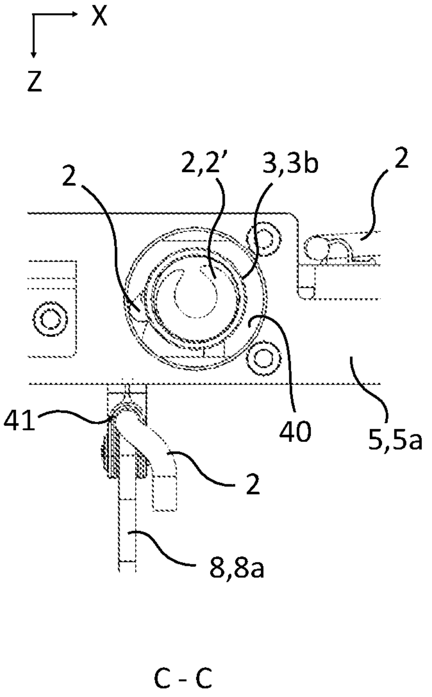
Figure 9C:
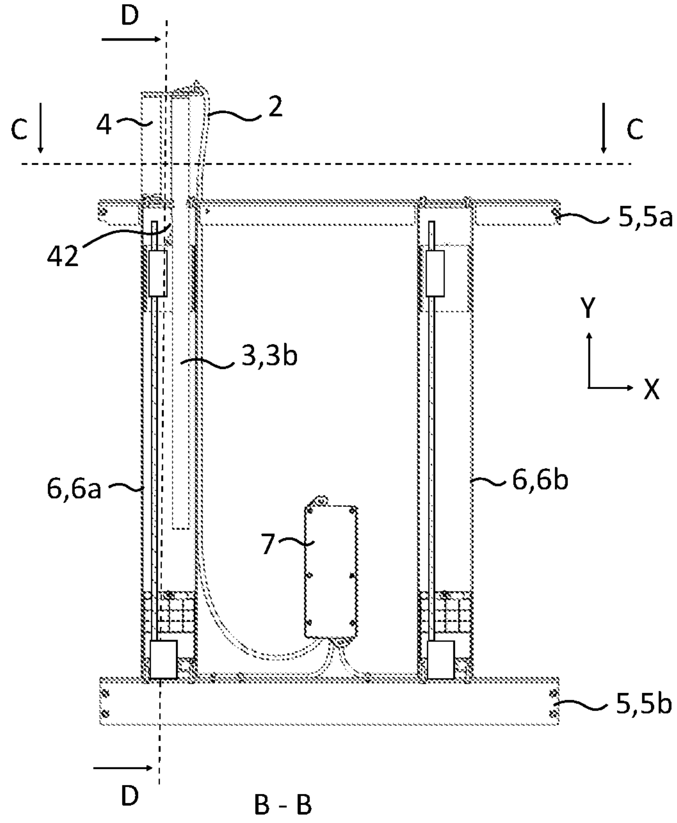
Figure 9D:
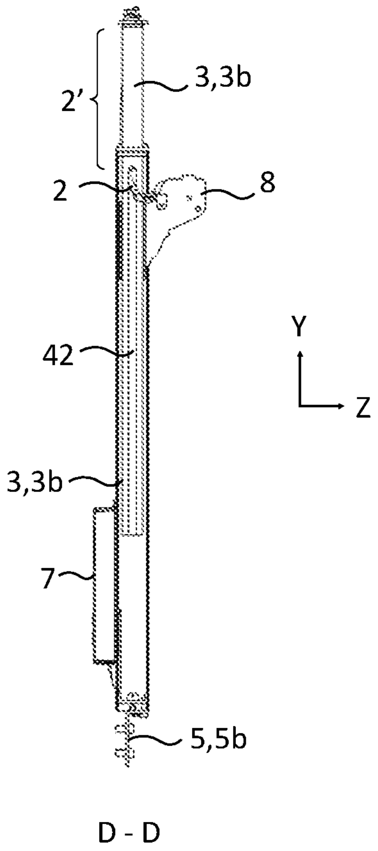

In certain embodiments, the vertical guiding element 6 of the adjustment mechanism assembly 1 within which a portion of the cable 2 is conveyed, comprises a vertical support member 3 at least partly within the vertical guiding element 6 for providing guidance and/or support fora portion of the cable 2. Such guidance may be provided for example so that a portion of the cable 2 is arranged in a spiral or helix, and that spiraled portion of the cable is supported with respect to its central axis or in an upright position by the vertical support member 3. That portion of the cable is hereafter referred to as a spiraled portion 2' of the cable 2. The vertical support member 3 provides or is arranged to provide support for the spiraled portion 2' of the cable 2 so that the spiraled portion 2' may remain aligned with respect to its central axis C, as illustrated for example in FIGS. 8*a* and 8*b*. The vertical support member 3 is arranged to provide support for the spiraled portion 2' of the cable 2 also when the spiraled portion 2' alternates between its contracted state, as illustrated in FIG. 8*b*, and its extended state, as illustrated in FIG. 8*a*.

In certain embodiments, the vertical support member 3 is or comprises a rod 3*a*, and the spiraled portion 2' of the cable 2 may be spiraled or wound around the rod 3*a*, for example as shown in the embodiments of FIGS. 1-5. Such a rod 3*a* may be solid, i.e. devoid of any internal cavities, which has the advantage of being structurally highly rigid. Alternatively, such a rod 3*a* may be hollow, i.e. tubular, which has the advantage of being light while structurally sufficiently rigid.

In certain embodiments, the vertical support member 3 may be or comprise a pipe 3*b* comprising a slit 42, an example of which is shown in the embodiment of FIGS. 9*a*-9*d* for example. The spiraled portion 2' of the cable 2 may be arranged within the pipe 3*b*, preferably coaxially with the pipe 3*b*. In certain embodiments, wherein the vertical support member 3 is or comprises a pipe 3*b*, that region of the pipe 3*b* over which the cable 2 is configured to move, due to movement of the work surface support element 8, may comprise the slit 42, so that a portion of the cable 2 which exits the pipe 3*b*, preferably en route to the work surface support element 8, may travel within the slit 42 in accordance with the movement of the work surface support element 8. In certain embodiments, wherein the vertical support element is or comprises a pipe 3*b*, the cable 2 may enter, en route from a control unit 7, into the pipe 3*b* through an open end of the pipe 3*b*, as shown for example in the embodiment of FIG. 9*a*. The notion of a "pipe" refers herein to a cylindrical, hollow item preferably with open ends and/or a slit in its longitudinal direction.

Figure 10A:
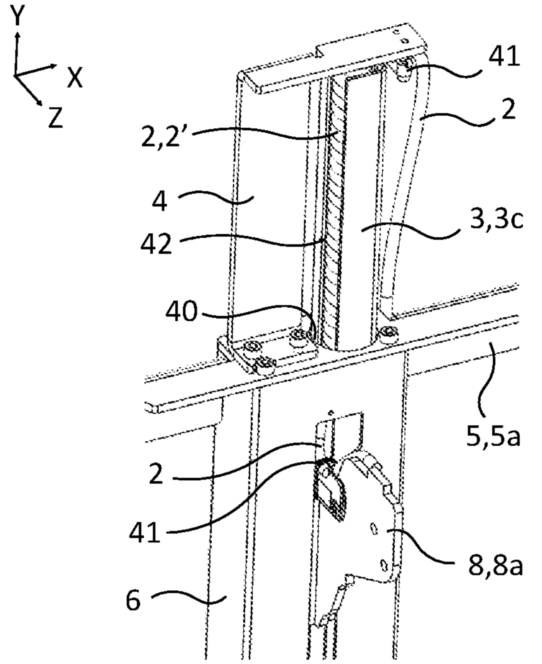
FIGS. 10*a*-10*d* schematically illustrate, according to yet another example embodiment, an adjustment mechanism assembly according to the disclosed solution.

In certain embodiments, the vertical support member 3 may be or comprise an enclosure 3*c*, an example of which is shown in the embodiments of FIGS. 10*a*-10*d*. The spiraled portion 2' of the cable 2 may be arranged within the enclosure 3*c*, preferably coaxially with the enclosure 3*c*. In certain embodiments, wherein the vertical support member 3 is or comprises an enclosure 3*c*, that region of the enclosure 3*c* over which the cable 2 is configured to move, due to movement of the work surface support element 8, may comprise a slit 42, so that portion of the cable 2 which exits the enclosure 3*c* en route to the work surface support element 8 may travel within the slit 42 in accordance with the movement of the work surface support element 8. In certain embodiments, wherein the vertical support element is an enclosure 3*c*, the cable 2 may enter, en route from a control unit 7, into the enclosure 3*c* through an open end of the enclosure 3*c*, for example as shown in the embodiment of FIG. 10*a*. The structure of the enclosure 3*c* may be simplified by making the slit 42 run over the entire length of the enclosure 3*c*, as shown in the embodiments of FIGS. 10*a*-10*d*, allowing the enclosure 3*c* to be manufactured for example by bending for example a sheet metal into a semi-open enclosure 3*c* comprising the slit 42 over the entire length of the enclosure 3*c*. The enclosure 3*c* may have an open end or ends.

In certain embodiments, the vertical support member 3 may be or comprise a wall 3*d* or a plate, an example of which is shown for example in the embodiment of FIGS. 11*a*-11*d*. Such a wall 3*d*, extending into and within the vertical guiding element 6, forms an internal semi-enclosed space between the wall 3*d* and the vertical guiding element 6, for example one of the internal walls of the vertical guiding element 6. Such a setup has the advantage of simplicity as no slitted elements are required and the spiraled portion 2' of the cable 2 requires no support element 3 inserted within it.

The above-mentioned types of vertical support members 3 may be used in combination in order to provide the spiraled portion 2' of the cable 2 with greater support and/or protection against wear and risk of damage.

An adjustment arrangement comprising a spiraled portion 2' of the cable 2 and a vertical support member 3 supporting the spiraled potion 2' is advantageous in that during the upwards and downwards travel of the work surface support element 8 connected to the vertical guiding element 6, the spiraled portion 2' of the cable 2 extends and contracts, while maintaining the orientation of its central axis C, along with the movement of the work surface support element 8, enabling variable effective length L for the spiraled portion 2' of the cable 2 depending on the vertical position of the work surface support element 8. The vertical support member 3 provides the advantage of preventing the spiraled portion 2' of the cable 2 from coming into contact with the internal wall(s) and/or other internal parts such as a threaded rod 30 optionally comprised in the vertical guiding element 6 and/or a mounting support element 5 during movement of the cable 2, reducing or even eliminating wear on and/or damage of the cable 2. Furthermore, the vertical support member 3 guides and/or supports the spiraled portion 2' of the cable 2 such that it may occupy just little space within the vertical guiding element 6 as the spiraled portion 2' stays aligned with respect to its central axis C (i.e. by preventing tilting of the spiraled potion 2' of the cable 2).

In certain embodiments, the vertical support member 3 comprises a rod 3*a* around which the spiraled potion 2' of the cable 2 is spiraled and an enclosure 3*c* or pipe 3*b* housing the spiraled portion 2'. Having the spiraled portion 2' of the cable 2 spiraled around the rod-type support member 3,3*a* and housed within a pipe-type support member 3,3*b* or housed within an enclosure-type support member 3,3*c* enables the spiraled portion 2' of the cable 2 to stay particularly well-aligned with respect to its central axis C, allowing for example an aperture 40—as described below—of the vertical guide member to be smaller in diameter.

As schematically illustrated in FIGS. 8*a* and 8*b*, the variable effective length L for at least a portion of the cable 2—in the above-mentioned embodiments for the spiraled portion 2' of the cable 2—is advantageous because loosely hanging cable portions will not be formed when the work surface support element 8 is moved away from a position in which a great length for the cable 2 is required to a position requiring less cable 2 length. Also, the variable effective length L for at least a portion of the cable 2—in the above-mentioned embodiments for the spiraled portion 2' of the cable 2—provides a simple and convenient way for arranging portion of the cable 2 allowing or following movement of the work surface support element 8. Thus, with variable effective length L for at least a portion of the cable 2, there is no need to make or provide a larger and/or more complex cable-housing element to accommodate temporary surplus length formed when the work surface support element 8 is moved away from a position in which a great length for the cable 2 is required to a position requiring less cable 2 length, as would be the case with a cable carrier track-based solution, for example. Moreover, with variable effective length L of at least a portion of the cable 2, risk for cable damage is reduced as loosely hanging temporary surplus length of the cable will not be formed within the vertical guiding element 6.

In certain embodiments, the support member 3 extends both within and outside the vertical guiding element 6. Such an arrangement is advantageous in that at least a portion of the spiraled portion 2' of the cable 2 may reside outside the vertical guiding element 6 while being supported by the vertical support member 3, thus providing more range of movement for the work surface support element 8 without the spiraled portion 2' of the cable 2 becoming a movement-restricting obstacle for the worksurface support element 8, even when a large movement range for the work surface support element 8 is provided.

In certain embodiments wherein the vertical support element 3 extends from within the vertical guiding element 6 to outside the vertical guiding element 6, the vertical guiding element 6 may be a rod-type support member 3,3*a*, for example as shown in the embodiment of FIGS. 1-5, a pipe-type support member 3,3*b*, for example as shown in the embodiment of FIGS. 9*a*-9*d*, an enclosure-type support member 3,3*c*, for example as shown in the embodiment of FIGS. 10*a*-10*d*, and/or a wall- or plate-type support member 3,3*d*, for example as shown in the embodiment of FIGS. 11*a*-11*d*.

In embodiments in which the spiraled portion 2' of the cable 2 resides, while being supported by the vertical support element 3, at least partly outside the vertical guiding element 6, the vertical guiding element 6 may comprise an aperture 40 at one vertical end of the vertical guiding element 6, such as an upper end of the vertical guiding element 6, through which aperture 40 the vertical support member 3 and optionally the spiraled portion 2' of the cable 2 extend to outside the vertical guiding element 6. Such an aperture-based arrangement as just described is advantageous in that it allows the spiraled portion 2' of the cable 2 to reside partially inside the vertical guiding element 6 and partially outside the vertical guiding element 6 while allowing a large range of movement for the spiraled portion 2' to expand and contract. Such an arrangement also enables a setup in which the entire spiraled portion 2' may reside outside the vertical guiding element 6 in its contracted state (c.f. also FIG. 8*b*) while allowing it to extend into the inside of the vertical guiding element 6 in its extended state (c.f. also FIG. 8*a*).

Figure 5:
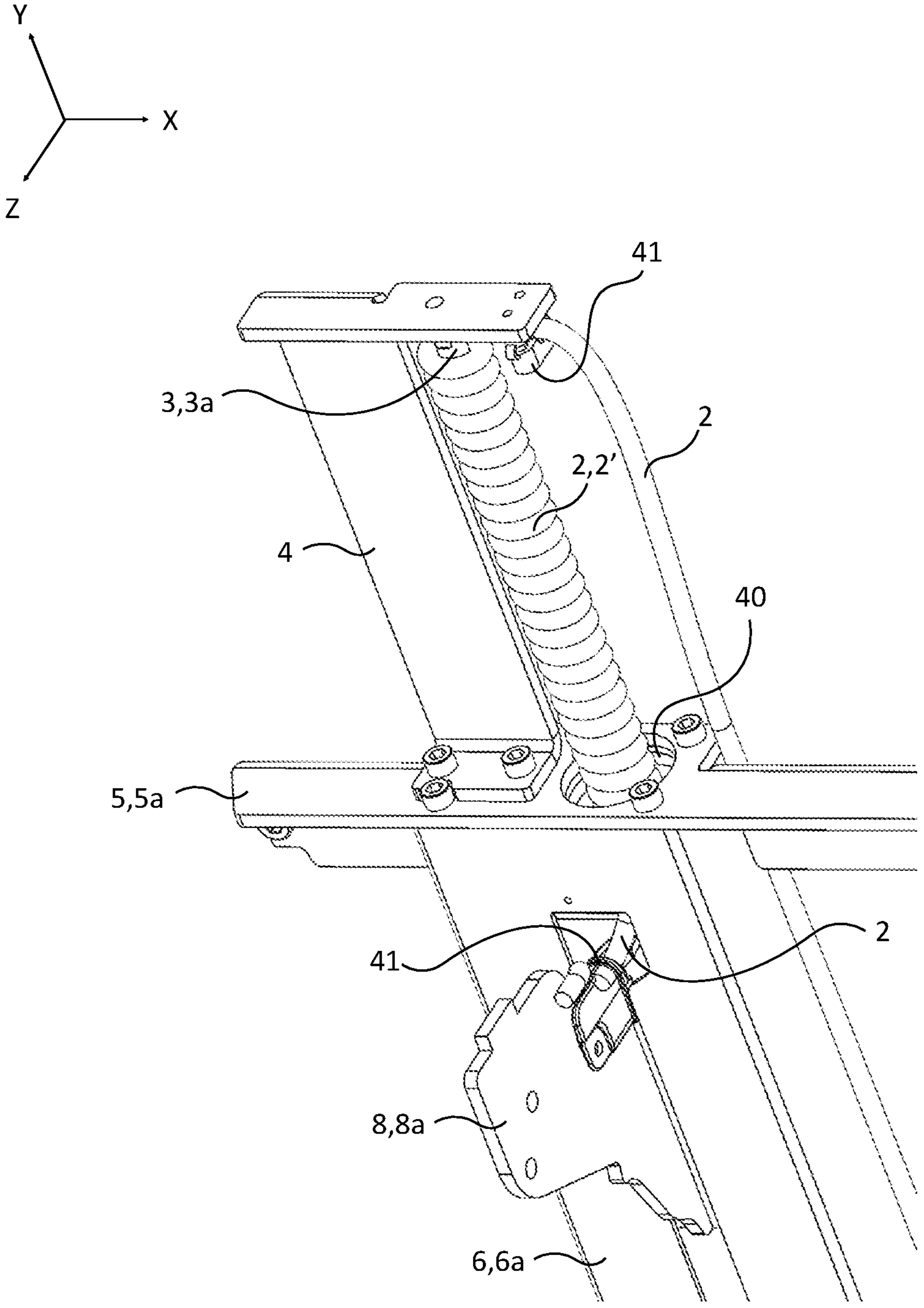
FIG. 5 schematically illustrates a partial enlargement of the adjustment mechanism assembly of FIG. 1 as depicted diagonally from above.

In embodiments in which the adjustment mechanism assembly 1 comprises a mounting support element 5, the mounting support element 5 may be attached to the same vertical end of the vertical guiding element 6 in which said aperture 40 resides. The mounting support element 5 may be provided with an aperture that coincides with the aperture 40 of the vertical guiding element 6 (coinciding aperture), for example as shown in the embodiment of FIG. 5. In FIG. 5, reference sign 40 refers to both the aperture of the vertical guiding element 6 and a coinciding aperture of the mounting support element 5.

Preferably, the aperture 40 of the vertical guiding element 6 and/or the coinciding aperture 40 of the mounting support element 5 has (have) a diameter which is greater than the outer diameter of the spiraled portion 2' of the cable 2 to enable the spiraled portion 2', supported by the support member 3, to expand and contract without restriction or obstruction by the aperture(s) 40. The aperture 40 of the vertical guiding element 6 and the coinciding aperture 40 of the mounting support element 5 may have different diameters.

In certain embodiments, the adjustment mechanism assembly 1 comprises a support element 4 arranged to support the vertical support member 3 on the outside of the vertical guiding element 6 to provide positional and alignment stability for the vertical support member 3. Such positional and alignment stability is desirable to prevent the support member 3 from changing position and/or alignment which could for example cause the cable 2 to get into touch with the inner surface or internal components of the vertical guiding element 6 and/or the optional mounting support element 5, creating a risk for cable 2 damage. In certain embodiments, the end of the support member 3 extending to outside the guiding element 6 is connected to a support element 4 provided outside the vertical guiding element 6 to provide support for the portion of the vertical guiding member 3 extending outside the vertical guiding element 6.

In certain embodiments, the height (in the vertical or longitudinal direction) of the adjustment mechanism assembly 1 is constant. In other words, the height of the adjustment mechanism assembly 1 is invariable or fixed, i.e. the height of the adjustment mechanism assembly 1 is configured to be unchangeable. Compared to e.g. a telescopic structure, a gained advantage is that the assembly 1 can be firmly attached to the mounting surface or wall by the vertical guiding element 6, for example, at top and bottom ends of the vertical guiding element 6. Further, a non-contracting vertical guiding element is easier to manufacture. Also, the height (in the vertical or longitudinal direction) of the vertical guiding element 6 or/and the vertical support member 3 may be constant (invariable or fixed or configured to be unchangeable).

The vertical guiding element 6 and/or the vertical support member 3 may be arranged to be immobile or stationary. For example, when the work surface support member(s) 8 move(s) actuating contraction or extension of the spiral portion 2' of the cable 2, the vertical guiding element 6 and/or the vertical support member 3 may stay in place.

In certain embodiments, the vertical guiding element (or its outer shell) is a one-piece element. In certain embodiments, the vertical guiding element consists essentially of one vertical guiding member. Said vertical guiding member is preferably a one-piece member, such as a one-piece column. The adjustment mechanism assembly 1 in certain embodiments is non-telescopic.

Figure 10B:
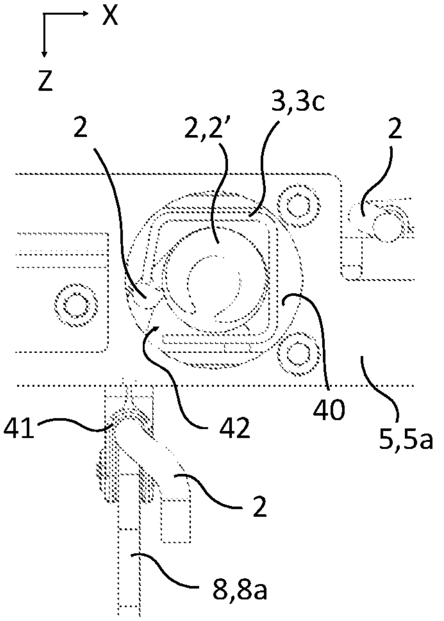
Figure 10C:
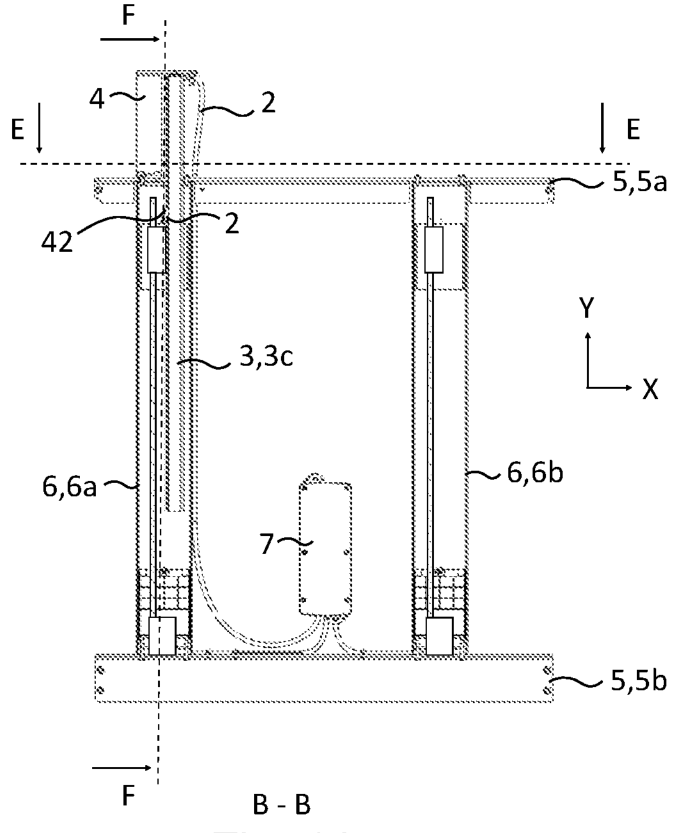
Figure 10D:
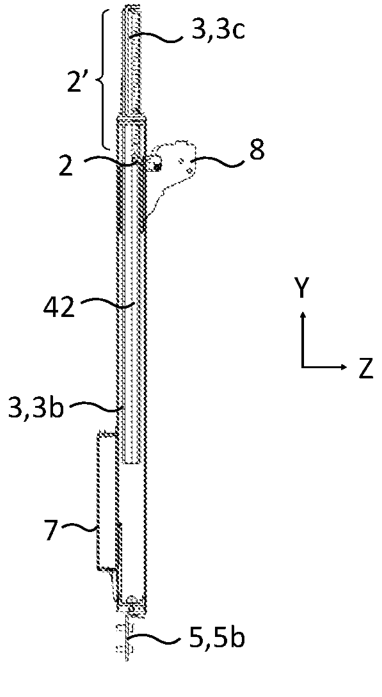
Figure 11A:
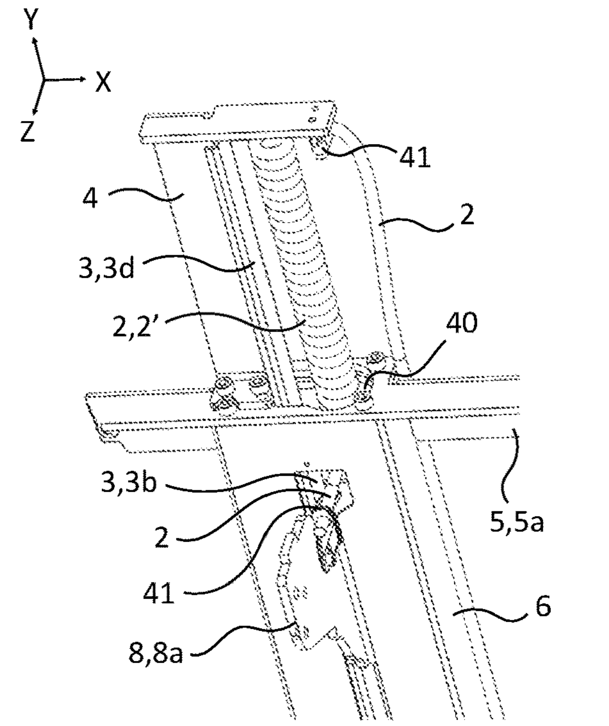
FIGS. 11*a*-11*d* schematically illustrate, according to still another example embodiment, an adjustment mechanism assembly according to the disclosed solution.
Figure 11B:
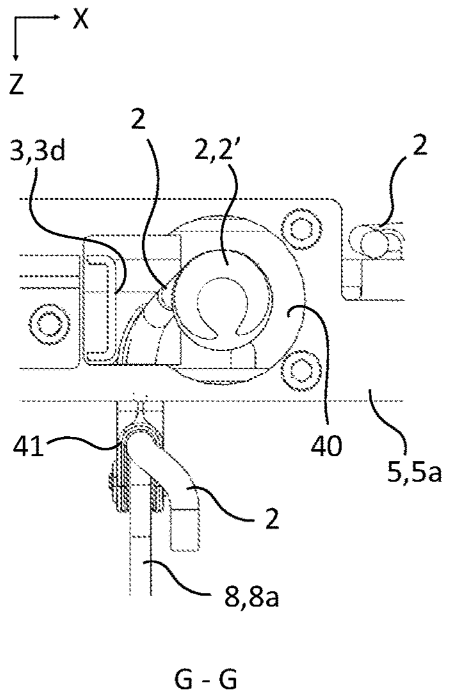
Figure 11C:
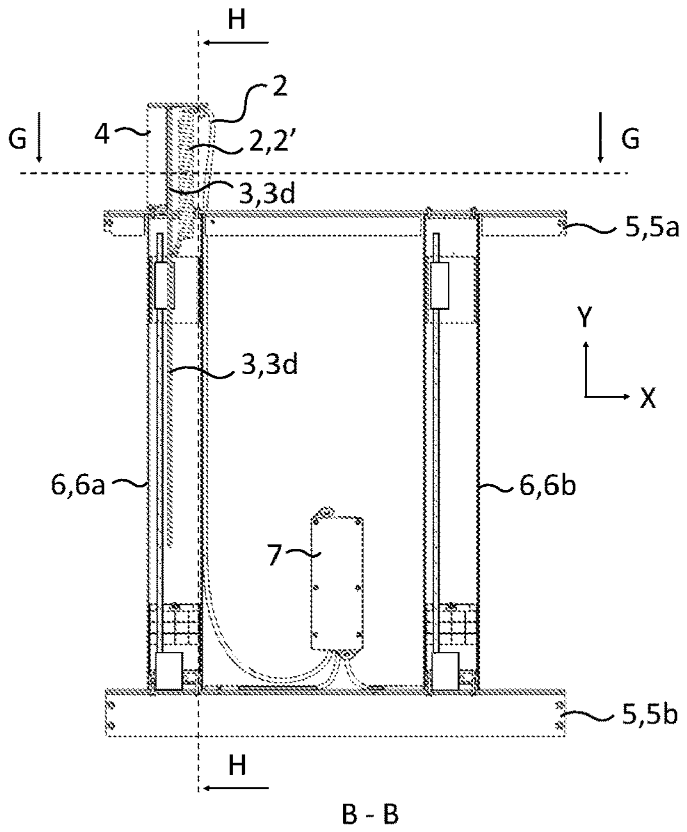
Figure 11D:
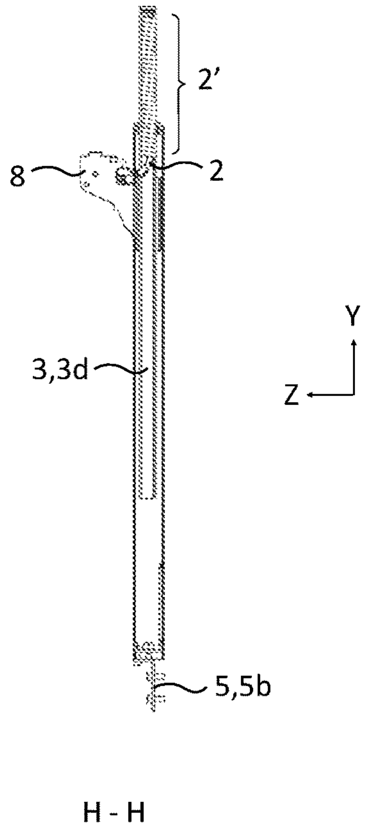

In certain embodiments, wherein the adjustment mechanism assembly 1 comprises a support element 4, the vertical support member 3 may be a rod-type support member 3,3*b*, for example as shown in the embodiment of FIG. 5, a pipe-type support member 3,3*b*, for example as shown in the embodiment of FIGS. 9*a*-9*d*, an enclosure-type support member 3,3*c*, for example as shown in the embodiment of FIGS. 10*a*-10*c*, and/or a wall- or plate-type support member 3,3*d*, for example as shown in the embodiments of FIGS. 11*a*-11*d*.

The support element 4 may be an independent element connected, for example, to the vertical guiding element 6 or a mounting support element 5, preferably with the benefit of positional adjustment via the connection by way of, for example, elliptical bolt holes. Alternatively, the vertical guiding element 6 or a mounting support element 5 may comprise the support element 4 as a structural feature with the benefit of increased structural rigidity due to structural integrity.

In certain embodiments, the vertical support member 3 resides completely within the vertical guiding element 6. The vertical support member 3 residing within the vertical guiding element 6 may be any type of vertical support member described in the foregoing. In embodiments wherein the vertical support element 3 resides completely within the vertical guiding element 6, the vertical guiding element 6 may be for example a rod-type support member 3,3*a*, a pipe-type support member 3,3*b*, an enclosure-type support member 3,3*c*, and/or a wall- or plate-type support member 3,3*d*.

In certain embodiments, the spiraled portion 2' of the cable 2 resides completely within the vertical guiding element 6. The vertical guiding element 6 may be dimensioned to be able to house (completely) within it both the vertical support member 3 and at least the spiraled portion 2' of the cable. The cable 2 may exit the vertical guiding element 6 from an end portion of the vertical guiding element 6, such as its top portion, for example through an aperture arranged therein. In embodiments wherein the vertical support member 3 resides completely within the vertical guiding element 6, the vertical guiding element 6 may be taller than, or substantially as tall as, the vertical support member 3.

In certain embodiments, wherein the vertical support member 3 resides completely within the vertical guiding element 6, the vertical guiding element 6 is configured to support the vertical support member 3 to provide positional and alignment stability for the vertical support member 3. Such positional and alignment stability is desirable to prevent the support member 3 from changing position and/or alignment as described in the foregoing. For example, an end portion of the vertical support member 3 may be connected to an end portion of the vertical guiding element 6 to provide positional and alignment stability for the vertical support member 3. In such embodiments a support element 4 may not be needed. For example, the upper end of the vertical support member 3 may terminate at and be supported by the top portion (roof) of the vertical guiding element 6, as shown for example in FIG. 12*c*.

Also in embodiments wherein the vertical support member 3 extends vertically from within the vertical guiding element 6 to outside the vertical guiding element 6 positional and alignment stability for the vertical support member 3 may be provided without necessarily needing a support element 4. For example, the upper end of the vertical support member 3 may extend to outside the vertical guiding element 6 and terminate at and be supported by a mounting support element 5, as shown for example in FIG. 12*b*.

Figure 12A:
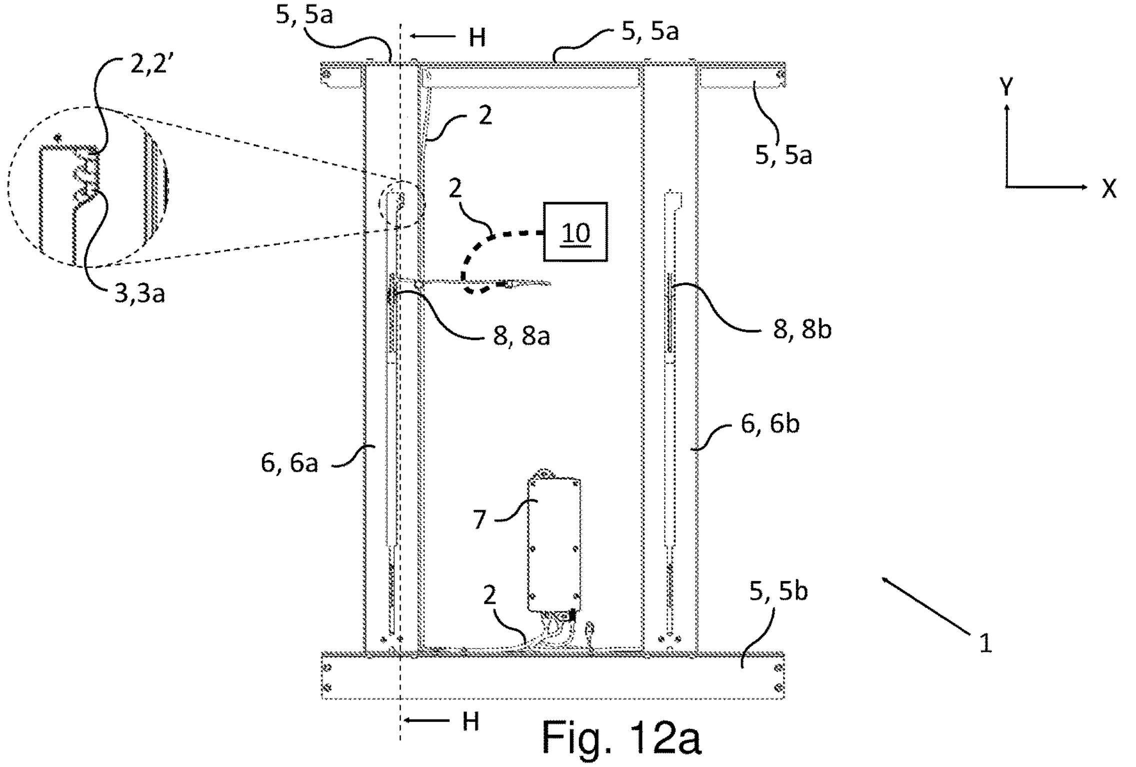
FIGS. 12*a*-12*c* schematically illustrate, according to yet further example embodiments, adjustment mechanism assemblies according to the disclosed solution.
Figure 12B:
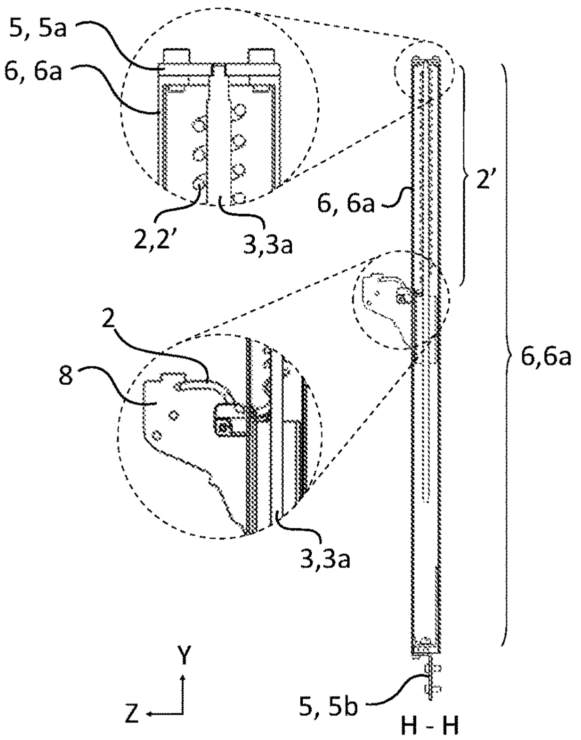
Figure 12C:
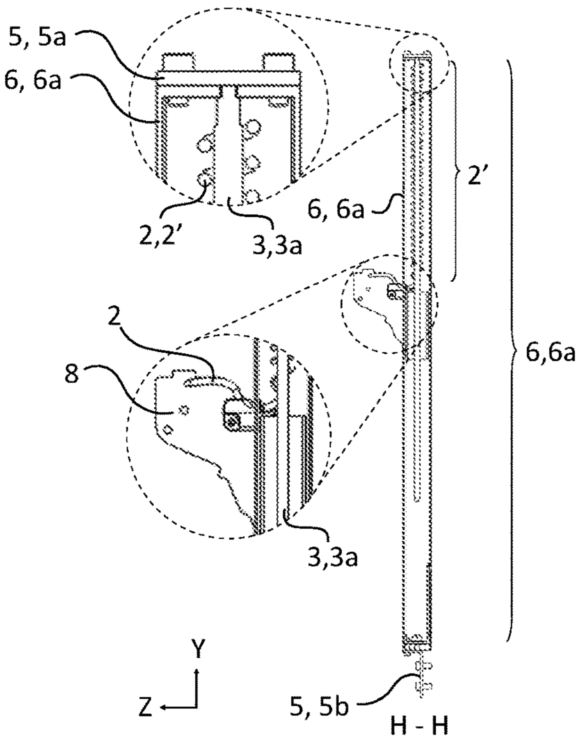

FIGS. 12*a* and 12*c* show example embodiments wherein the vertical support member 3 resides completely within the vertical guiding element 6. FIG. 12*a* shows the adjustment mechanism assembly as viewed from the front, and FIG. 12*c* as viewed in a cross-section denoted in FIG. 12*a*. In FIGS. 12*a* and 12*c*, the vertical support member 3, 3*a* is a rod around which the spiraled portion 2' of the cable 2 is wound, and the upper end portion of the vertical support member 3 is attached to the upper end portion of the corresponding vertical guiding element 6 (the roof of the vertical guiding element) for support. In FIGS. 12*a* and 12*c*, the spiraled portion 2' of the cable 2 is arranged completely within the vertical guiding element 6. In FIGS. 12*a* and 12*c*, the cable 2 enters the vertical guiding element 6 at the work surface support element 8, and exits the vertical guiding element 6 though an aperture arranged in the upper end portion of the vertical guiding element 6.

With respect to dimensioning the vertical support member 3, it is preferred that that end of the support member 3 which resides within the vertical guiding element 6 extends so far, i.e. to such a vertical position, that it still surpasses the work surface support element 8 when the work surface support element 8 is at a position that, in a certain application, is arranged to be its farthest position from the other or opposite end of the vertical support member 3. In other words, the vertical support member 3 should advantageously be, within the vertical guiding element 6, so long that the spiraled portion 2' of the cable 2 remains supported by the vertical support member 3 even when fully extended so that when the spiraled portion 2' of the cable 2 thereafter contracts, there is no risk of a portion of the spiraled portion 2' of the cable 2 to contract past the vertical support member 3.

It is preferred that the cable 2 does not undergo travel along its path (outside the spiraled portion 2' of the cable 2), e,g, does not travel towards or away from the electrical user interface 10 or the control unit 7 (or an equivalent connecting point). This is preferred because such travel could create tension at either end of the cable 2, risking the cable 2 becoming detached from its connection at either end or becoming damaged. For this purpose, the cable 2 is advantageously secured in place along its path e.g. with strain reliever fixtures.

In certain embodiments, for example as shown in the embodiment of FIG. 5, to prevent such travel of (at least a portion of) the cable 2 as described just above, the work surface support element 8 and/or the support element 4 for the vertical support member 3 is (are each) equipped with a strain reliever 41 which provides a fixing point for the cable 2. Such an arrangement is beneficial, especially when both the work surface support element 8 and the support element 4 for the vertical support member 3 are each equipped with a strain reliever 41, because the spiraled portion 2' of the cable 2 may extend and contract between the strain relievers 41 without any restraint created by fixing points whereas the cable 2 thereafter, i.e. beyond the strain relievers 41, remains immovable along its path.

Advantageously, the strain reliever 41 at the work surface support element 8 may be configured such that it envelops the cable 2 at this fixing point, for example as shown in the embodiment of FIG. 5, to protect the cable 2 for example from hitting the sides of the slit through which the work surface support element 8 extends and the cable 2 enters into the vertical guiding element 6.

Advantageously, in embodiments in which the vertical support member 3 comprises a slit 42, the strain reliever 41 at the work surface support element 8 may be configured such that it extends inwards into the vertical guiding element 6 and near or adjacent to the slit 42. This has the advantage of that part of the cable 2 which is at the slit 42 being precisely positioned with respect to the mouth of the slit 42, reducing or even eliminating cable 2 wear due to the cable 2 being or becoming in contact with the walls of the slit 42.

While most of the illustrations in the Figures depict the vertical support member 3 to extend to above the vertical guiding element 6, the same principles as described above apply, mutatis mutandis, to cases in which the support member 3 extends to below the vertical guiding element 6, for example as illustrated in the embodiment of FIG. **7*d*. Such an implementation has e.g. the advantage that the spiraled portion 2' of the cable 2 contracts easily and with less or no pushing force required, as pulled by gravity. It may also be that dimensional requirements in a usage context of the adjustment mechanism assembly 1 require the space occupied by that part of the support member 3 which extends to outside the vertical guiding element 6, to reside below, rather than above, the vertical guiding element 6, i.e. when there is a dimensional requirement that the adjustment mechanism assembly 1 terminates at its top at the upper end of the vertical guiding element(s) 6**, as may be in the case of a floor-standing work desk, for example.

The cable 2 may comprise more than one or several electricity- and/or signal-conveying wires while adhering to the principles described above. The cable 2 can take the form of a bundle of individual cables while adhering to the principles described above.

The above-described embodiments and examples are intended to explain the general idea of the disclosed solution. Therefore, such examples are not to be taken as exhausting the ways in which the general idea of the disclosed solution may be implemented.

Various embodiments have been presented. It should be appreciated that in this document, words "comprise", "include", and "contain" are each used as open-ended expressions with no intended exclusivity.

The foregoing description has provided by way of non-limiting examples of particular implementations and embodiments a full and informative description of the best mode presently contemplated by the inventors for carrying out the invention. It is however clear to a person skilled in the art that the invention is not restricted to details of the embodiments presented in the foregoing, but that it can be implemented in other embodiments using equivalent means or in different combinations of embodiments without deviating from the characteristics of the invention.

Furthermore, some of the features of the afore-disclosed example embodiments may be used to advantage without the corresponding use of other features. As such, the foregoing description shall be considered as merely illustrative of the principles of the present invention, and not in limitation thereof. Hence, the scope of the invention is only restricted by the appended patent claims.

Implementation and embodiments of the present solution are further discussed in the following numbered clauses:

1. An adjustment mechanism assembly for adjusting a work surface position vertically, comprising
   - a vertical guiding element,
   - a work surface support element engaged with the vertical guiding element and configured to be movable vertically with electric actuation,
   - means for said electric actuation comprising a cable, and
   - a vertical support member which extends vertically from within the vertical guiding element to outside the vertical guiding element,
   - which cable comprises a spiraled portion between its termini, which spiraled portion is supported with respect to its central axis by the vertical support member.
2. The adjustment mechanism assembly according to clause 1, wherein
   - at least a portion of the spiraled portion of the cable resides outside the vertical guiding element.
3. The adjustment mechanism assembly according to clause 1 or 2, wherein
   - the cable is arranged to enter into inside of the vertical guiding element at the work surface support element.
4. The adjustment mechanism assembly according to any one of the preceding clauses, wherein
   - that end portion of the vertical support member which resides outside the vertical guiding element is connected to a support element configured to prevent movement of said end portion of the vertical support member.
5. The adjustment mechanism assembly according any one of the preceding clauses, comprising
   - at least two strain relievers connected to the cable such that the spiraled portion of the cable resides between two strain relievers.
6. The adjustment mechanism assembly according to clause 5, wherein
   - the support element comprises one of said two strain relievers,
   - the work surface support element comprises another of said two strain relievers, and
   - the spiraled portion of the cable resides between these two strain relievers.
7. The adjustment mechanism assembly according to any one of the preceding clauses, wherein
   - the vertical support member is a rod and
   - the spiraled portion of the cable is spiraled around the rod.
8. The adjustment mechanism assembly according to any one of clauses 1-6, wherein the vertical support member is a pipe comprising a vertically extending slit, and the spiraled portion of the cable is housed within the pipe.

9. The adjustment mechanism assembly according to any one of clauses 1-6, wherein the vertical support member is an enclosure comprising a vertically extending slit, and the spiraled portion of the cable is housed within the enclosure.

10. The adjustment mechanism assembly according to any one of clauses 1-6, wherein the vertical support member is a plate or wall, and the spiraled portion of the cable resides next to the plate or wall.

11. The adjustment mechanism assembly according to any one of the preceding clauses, comprising a further vertical guiding element, and a further work surface support element engaged with the further vertical guiding element and configured to be movable vertically.

12. The adjustment mechanism assembly according to any one of the preceding clauses, comprising at least one mounting support element connected to the vertical guiding element(s) and adapted for mounting the adjustment mechanism assembly.

13. A wall structure comprising an adjustment mechanism assembly according to any one of the preceding clauses.

14. The wall structure according to clause 13, wherein the adjustment mechanism assembly is mounted to an outer surface of the wall structure.

15. The wall structure according to clause 13, wherein the adjustment mechanism assembly is mounted to a mounting surface within the wall structure such that the work surface support element(s) extend to outside of the wall structure through vertical slit(s) in the wall structure configured to allow the work surface support element(s) to move vertically.

16. A height-adjustable table comprising an adjustment mechanism assembly according to any one of clauses 1-12, and a work surface supported by the work surface support element(s).

17. The height adjustable table according to clause 16, comprising at least one guiding element support member, such as a leg, adapted to support the vertical guiding element(s) in an upright position.

The invention claimed is:

1. An adjustment mechanism assembly for adjusting a work surface position vertically, comprising a non-telescopic vertical guiding element consisting of one vertical guiding member, a work surface support element engaged with the vertical guiding element and configured to be movable vertically with electric actuation, which work surface support element is arranged to protrude horizontally from within the vertical guiding element between the ends of the vertical guiding element, means for said electric actuation comprising a cable, and a non-telescopic vertical support member which resides at least partially within the vertical guiding element, which cable comprises a spiraled portion between its termini, which spiraled portion is supported with respect to its central axis by the vertical support member.

2. The adjustment mechanism assembly according to claim 1, wherein the vertical support member extends vertically from within the vertical guiding element to outside the vertical guiding element, or wherein the vertical support member resides completely within the vertical guiding element.

3. The adjustment mechanism assembly according to claim 1, wherein at least a portion of the spiraled portion of the cable resides outside the vertical guiding element.

4. The adjustment mechanism assembly according to claim 1, wherein the cable is arranged to enter into inside of the vertical guiding element at the work surface support element.

5. The adjustment mechanism assembly according to claim 1, wherein an end portion of the vertical support member which resides outside the vertical guiding element is connected to a support element configured to prevent movement of said end portion of the vertical support member.

6. The adjustment mechanism assembly according claim 1, comprising at least two strain relievers connected to the cable such that the spiraled portion of the cable resides between two strain relievers.

7. The adjustment mechanism assembly according to claim 6, wherein a support element comprises one of said two strain relievers, the work surface support element comprises another of said two strain relievers, and the spiraled portion of the cable resides between these two strain relievers.

8. The adjustment mechanism assembly according to claim 1, wherein the vertical support member is a rod and the spiraled portion of the cable is spiraled around the rod.

9. The adjustment mechanism assembly according to claim 1, wherein the vertical support member is a pipe comprising a vertically extending slit, and the spiraled portion of the cable is housed within the pipe.

10. The adjustment mechanism assembly according to claim 1, wherein the vertical support member is an enclosure comprising a vertically extending slit, and the spiraled portion of the cable is housed within the enclosure.

11. The adjustment mechanism assembly according to claim 1, wherein the vertical support member is a plate or wall, and the spiraled portion of the cable resides next to the plate or wall.

12. The adjustment mechanism assembly according to claim 1, comprising a further vertical guiding element, and a further work surface support element engaged with the further vertical guiding element and configured to be movable vertically.

13. The adjustment mechanism assembly according to any claim 1, comprising at least one mounting support element connected to the vertical guiding element(s) and adapted for mounting the adjustment mechanism assembly.

14. The adjustment mechanism assembly according to claim 1, wherein the vertical guiding element is:

constant in height; and/or
in itself immobile; and/or
non-contracting and non-extending in its height direction.

15. A wall structure comprising an adjustment mechanism assembly according to claim 1.

16. The wall structure according to claim 15, wherein
the adjustment mechanism assembly is mounted to an outer surface of the wall structure.

17. The wall structure according to claim 15, wherein
the adjustment mechanism assembly is mounted to a mounting surface within the wall structure
such that
the work surface support element(s) extend to outside of the wall structure through vertical slit(s) in the wall structure configured to allow the work surface support element(s) to move vertically.

18. A height-adjustable table comprising
an adjustment mechanism assembly according to claim 1, and
a work surface supported by the work surface support element(s).

19. The height adjustable table according to claim 18, comprising
at least one guiding element support member adapted to support the vertical guiding element(s) in an upright position.

* * * * *